United States Patent
Schiller (10) Patent No.: US 7,865,496 B1
(45) Date of Patent: Jan. 4, 2011

(54) SYSTEMS, DEVICE, AND METHODS FOR SEARCHING

(76) Inventor: Victor H. Schiller, 3005 Waverly Dr., Charlottesville, VA (US) 22901

( * ) Notice: Subject to any disclaimer, the term of this patent is extended or adjusted under 35 U.S.C. 154(b) by 595 days.

(21) Appl. No.: 11/290,904

(22) Filed: Nov. 30, 2005

Related U.S. Application Data (60) Provisional application No. 60/631,747, filed on Nov. 30, 2004.

(51) Int. Cl.
*G06F 17/30* (2006.01)

(52) U.S. Cl. .................................................. 707/708

(58) Field of Classification Search ...................... None
See application file for complete search history.

(56) References Cited

U.S. PATENT DOCUMENTS

| | | | |
|---|---|---|---|
| 6,334,110 B1 * | 12/2001 | Walter et al. | 705/14 |
| 7,181,438 B1 * | 2/2007 | Szabo | 1/1 |
| 2005/0216434 A1 * | 9/2005 | Haveliwala et al. | 707/1 |

* cited by examiner

*Primary Examiner*—Neveen Abel Jalil
*Assistant Examiner*—Farhan M Syed
(74) *Attorney, Agent, or Firm*—Vedder Price P.C.

(57) ABSTRACT

Certain exemplary embodiments comprise a method comprising, for a plurality of predetermined topics: reviewing a content of each of a plurality of electronic communications; and based on matches between a list of relevancy factors and the content of each of the reviewed electronic communications, automatically ranking the plurality of predetermined topics.

13 Claims, 9 Drawing Sheets

4000

| News Leaders | SmartReadMX | Up/Downgrades | +/- Pre-Announcements | Divs Splits etc. |

SmartReadMX Positive News (Total)

| Symbol | Company | srtIndex | View |
|---|---|---|---|
| AAPL | Apple Computer Inc. | 100 | stories |
| THO | Thor Industries, Inc. | 79 | stories |
| FDC | First Data Corp. | 76 | stories |
| AMZN | Amazon.com | 64 | stories |
| ENR | Energizer Holdings Inc. | 58 | stories |
| | | More SRT Positive News | |

SmartReadMX Negative News (Total)

| Symbol | Company | srtIndex | View |
|---|---|---|---|
| FII | Federated Investors | -100 | stories |
| PCYO | | -50 | stories |
| XL | XL Capital Ltd | -50 | stories |
| LCGI | | -44 | stories |
| JEF | Jefferies Group, Inc. | -44 | stories |
| 11/28/2005 | | More SRT Negative News | |

SmartReadMX Positive News (Average)

| Symbol | Company | sraIndex | View |
|---|---|---|---|
| VVO | | 100 | stories |
| PGR | Progressive Corp | 100 | stories |
| AMZN | Amazon.com | 95 | stories |
| TIE | Titanium Metals Corp | 91 | stories |
| MRVL | Marvell Technology Group Ltd. | 91 | stories |
| | | More SRA Positive News | |

SmartReadMX Negative News (Average)

| Symbol | Company | sraIndex | View |
|---|---|---|---|
| PCYO | | -100 | stories |
| FII | Federated Investors | -100 | stories |
| YHOO | Yahoo! Inc. | -88 | stories |
| CACH | Cache Inc. | -75 | stories |
| RACK | Rackable Systems | -50 | stories |
| 11/28/2005 | | More SRA Negative News | |

| News Leaders | SmartReadMX | Up/Downgrades | +/- Pre-Announcements | Divs Splits etc. |

4000

SmartReadMX Positive News (Total)

| Symbol | Company | srtIndex | View |
|---|---|---|---|
| AAPL | Apple Computer Inc. | 100 | stories |
| THO | Thor Industries, Inc. | 79 | stories |
| FDC | First Data Corp. | 76 | stories |
| AMZN | Amazon.com | 64 | stories |
| ENR | Energizer Holdings Inc. | 58 | stories |

More SRT Positive News

SmartReadMX Positive News (Average)

| Symbol | Company | sraIndex | View |
|---|---|---|---|
| VYO | | 100 | stories |
| PGR | Progressive Corp | 100 | stories |
| AMZN | Amazon.com | 95 | stories |
| TIE | Titanium Metals Corp | 91 | stories |
| MRVL | Marvell Technology Group Ltd. | 91 | stories |

More SRA Positive News

SmartReadMX Negative News (Total)

| Symbol | Company | srtIndex | View |
|---|---|---|---|
| FII | Federated Investors | -100 | stories |
| PCYO | | -50 | stories |
| XL | XL Capital Ltd | -50 | stories |
| LOGI | | -44 | stories |
| JEF | Jefferies Group, Inc. | -44 | stories |

11/28/2005  More SRT Negative News

SmartReadMX Negative News (Average)

| Symbol | Company | sraIndex | View |
|---|---|---|---|
| PCYO | | -100 | stories |
| FII | Federated Investors | -100 | stories |
| YHOO | Yahoo! Inc. | -88 | stories |
| CACH | Cache Inc. | -75 | stories |
| RACK | Rackable Systems | -50 | stories |

11/28/2005  More SRA Negative News

Fig. 4

| News Leaders | SmartReadMX | Up/Downgrades | +/- Pre-Announcements | Divs Splits etc. |

5000

Today's News Leaders

| Symbol | Company | # | View |
|---|---|---|---|
| MRK | Merck & Co Inc. | 12 | stories |
| GM | General Motors | 10 | stories |
| APPX | | 9 | stories |
| FDC | First Data | 9 | stories |
| WLP.TO | | 7 | stories |

11/28/2005    More News Leaders

Above Average News Leaders

| Symbol | 90Day | Today | % change | View |
|---|---|---|---|---|
| CTV | 0.01 | 5 | 45,000 | stories |
| ACE.B.TO | 0 | 4 | 36,000 | stories |
| BULK | 0 | 4 | 36,000 | stories |
| MDY.TO | 0 | 4 | 36,000 | stories |
| RC.TO | 0.01 | 4 | 36,000 | stories |

11/28/2005    More Above Average Leaders

Fig. 5

| News Leaders | SmartReadMX | Up/Downgrades | +/- Pre-Announcements | Divs Splits etc. |

6000

Upgrades

| Broker | Symbol | To | From |
|---|---|---|---|
| Prudential Fin | ENR | Neutral Weight | Underweight |
| Morgan Stanley | DE | Overweight | Equal Weight |
| Deutsche Bank | RLSH | Buy | Hold |
| Prudential Fin | AKAM | Overweight | Neutral Weight |
| Deutsche Bank | MYK | Buy | Hold |

More Upgrades

11/28/2005

Downgrades

| Broker | Symbol | To | From |
|---|---|---|---|
| Thomas Weisel | INSP | Peer Perform | Outperform |
| Thomas Weisel | NFLX | Peer Perform | Outperform |
| Ryan Beck & Co | BBT | Underperform | Market Perform |
| CS First Bosto | KNX | Underperform | Neutral |
| A.G. Edwards | FI | Hold | Buy |

More Downgrades

11/28/2005

Coverage Initiated

| Broker | Symbol | Initiated At | Target |
|---|---|---|---|
| CS First Bosto | BOT | Underperform | $35 |
| CS First Bosto | CME | Neutral | $375 |
| Lehman Brother | WB.TO | Neutral | C$19.50 |
| Lehman Brother | XTXI | Overweight | N/A |
| Lehman Brother | XTEX | Overweight | N/A |

More Initiations

11/28/2005

Coverage Reiterated

| Broker | Symbol | Rating | Target |
|---|---|---|---|
| Thomas Weisel | RDC | Outperform | N/A |
| Ryan Beck & Co | MHL | Outperform | $20 Down From $23 |
| Prudential Fin | MHP | Overweight | $62 |
| Prudential Fin | BK | Overweight | $37 |
| A.G. Edwards | RDC | Buy | $42 Up From $39 |

More Reiterations

| News Leaders | SmartReadMX | Up/Downgrades | +/- Pre-Announcements | Divs Splits etc. |

7000

| Positive Pre-Announcements | | | |
|---|---|---|---|
| Symbol | Company | Current Est. | New Est. |
| BEAV | BE Aerospace | 1.10 | 1.12 |
| BEAV | BE Aerospace | 0.50 | 1.35 |
| BWS | Brown Shoe | 1.75 - 2.00 | 1.92 - 2.0 |
| GCO | Genesco Inc. | 2.28 - 2.30 | 2.34 - 2.3 |
| BFB | Brown-Forman C | 2.65 - 2.75 | 2.73 - 2.7 |
| 11/28/2005 | More Pos Pre-Announcements | | |

| Negative Pre-Announcements | | | |
|---|---|---|---|
| Symbol | Company | Current Est. | New Est. |
| ABS | Albertsons Inc | 1.37 - 1.47 | 1.37 - 1.4 |
| DLTR | Dollar Tree St | 1.57 - 1.66 | 1.53 - 1.5 |
| PETC | Correction Pe | 1.35 - 1.44 | 1.29 - 1.3 |
| PERY | Perry Ellis In | $850 Min | $850 - $86 |
| HAST | Hastings Entert | 0.47 - 0.50 | 0.37 - 0.4 |
| 11/22/2005 | More Neg Pre-Announcements | | |

Fig. 7

| News Leaders | SmartReadMX | Up/Downgrades | +/- Pre-Announcements | Divs Splits etc. |

8000

Dividends

| Company | Symbol | Amount | Record | Payable |
|---|---|---|---|---|
| BRE Properties | BRE | 0.50 | 12/15/05 | 12/30/05 |
| BCSB Bankcorp. | BCSB | 0.125 | 12/22/05 | 01/04/06 |
| Meta Financial | CASH | 0.13 | 12/15/05 | 01/03/06 |
| Abington Commu | ABBC | 0.05 | 12/07/05 | 12/21/05 |
| Cornerstone Ba | CSBQ.OB | 0.06 | 12/19/05 | 01/03/06 |

11/28/2005     More Dividends

Stock Splits

| Company | Symbol | Split | Record | Payable |
|---|---|---|---|---|
| J & J Snack Fo | JJSF | 2 for 1 | 12/15/05 | 01/03/05 |
| Hyperion Sodut | HYSL | 3 for 2 | 12/01/05 | 12/19/05 |
| Saffron Bancorp | SAEB.OB | 2 for 1 | 12/05/05 | 12/20/05 |
| Carolina Trust | CART | 1 for 10 | 12/01/05 | 12/16/05 |
| Amerisource Ber | ABC | 2 for 1 | 12/13/05 | 12/28/05 |

11/22/2005     More Stock Splits

Stock Buyback

| Company | Symbol | Buyback | Outstanding |
|---|---|---|---|
| United Capital | AFP | 1 Mn. | N/A |
| Elmira Savings | ESBK | 600K | N/A |
| SI Financial | SIFI | 5% | N/A |
| Callaway Golf | ELY | $50 Mn. | N/A |
| Norfolk Southe | NSC | 50 Mn. | N/A |

11/28/2005     More Buybacks

Earnings Revisions

| Company | Symbol | Prev Est | Rev Est | %Chg |
|---|---|---|---|---|
| VeriFone Hldd | PAY | 0.78 | 0.77 | -1.28 |
| Deere & Co. | DE | 6.5 | 6.45 | -0.77 |
| Deere & Co. | DE | 6.55 | 6.95 | 6.11 |
| Alexion Pharma | ALXN | -3.56 | -3.37 | 5.34 |
| Alexion Pharma | ALXN | -1.97 | -1.78 | 9.64 |

11/28/2005     More Earnings Revisions

Symbol: AAPL [Back]

Deutsche Bank Is Increasing Apple Computer 2006 Estimate To 1.85 From 1.70
(RTTNews) - Deutsche Bank Is Increasing Apple Computer (AAPL) 2006 Estimate To 1.85 From 1.70

*11/28/2005 1:02:00 PM*

Deutsche Bank Is Raising Apple Computer 2007 Estimate To 2.20 From 2.00
(RTTNews) - Deutsche Bank Is Raising Apple Computer (AAPL) 2007 Estimate To 2.20 From 2.00

*11/28/2005 1:02:00 PM*

Broader Indices Now Showing Mixed Performance - U.S. Commentary
(RTTNews) - The Dow has continued to tick up in the past 30 minutes, continuing a recovery it began in the middle of the 10 o'clock hour. The blue chip average is now sitting just above the unchanged mark. The Nasdaq, meanwhile, continues to hold near its intraday lows, down about 0.6% on the day. Dow +6.40, Nasdaq -12.18, S&P 500 -3.86. NYSE Adv/Dec 1218/1885, Nasdaq Adv/Dec 944/1917.

With oil prices adding to their losses through much of the morning, energy stocks have continued to decline. The oil service space, which often leads moves in the group, is now down nearly 3%. The housing and biotech sectors have also fallen through most of the morning, with each now showing a loss of about 2%.

The disk drive sector is off its highs, but continues to hold most of the gains it recorded in the first few minutes of trading. The space is up about 1.8%, ticking above a recent trading range to set a new high. The airline sector also rallied at the start of trading, but has been moderating over the past couple hours and is now up less than 1%.

The 5% gain in First Data (FDC), sparked by a CEO change, has taken the stock to a new 52-week high. Apple (AAPL) has also set a fresh peak, though it has come off its high since the first few minutes of trading. Circuit City (CC) is expanding a high set over the past couple weeks.

Shanda Interactive (SNDA) has broken to a new 52-week low after announcing the adoption of a new revenue model for its MMORPGs. Alexion Pharmaceuticals (ALXN) is adding to a sharp decline it posted last week, extending its low.

*11/28/2005 11:54:00 AM*

Apple Computer Inc. - UPDATE - Continues To Rise Before The Open
(RTTNews) - We alerted readers at 7:21 that Apple Computer Inc. (AAPL) was trading higher before the open. Amazon.com reported that Apple's iPod nano music player was among the top-selling electronic items on Black Friday. Apple is now up 1.41 on 115K shares Monday morning on Inet.

USB Piper Jaffray reiterated its "Outperform" rating on Apple this morning and increased its price target from $68 to $79.

Apple Computer Inc. gapped up and climbed higher in the first 45 minutes of Friday's session and rose further in the final 30 minutes. The stock finished up by 2.23 at $69.34.

SYSTEMS, DEVICE, AND METHODS FOR SEARCHING

CROSS-REFERENCES TO RELATED APPLICATIONS

This application claims priority to, and incorporates by reference herein in its entirety, pending U.S. Provisional Patent Application Ser. No. 60/631,747, filed 30 Nov. 2004.

BRIEF DESCRIPTION OF THE DRAWINGS

A wide variety of potential practical and useful embodiments will be more readily understood through the following detailed description of certain exemplary embodiments, with reference to the accompanying exemplary drawings in which:

FIG. 5 is a screen shot of an exemplary embodiment of a user interface 5000;

FIG. 9 is a screen shot of an exemplary embodiment of a user interface 9000.

DEFINITIONS

When the following terms are used substantively herein, the accompanying definitions apply:

a—at least one.

activity—an action, act, step, and/or process or portion thereof.

adapted to—made suitable or fit for a specific use or situation.

and/or—either in conjunction with or in alternative to.

apparatus—an appliance or device for a particular purpose automatically—acting or operating in a manner essentially independent of external influence or control. For example, an automatic light switch can turn on upon "seeing" a person in its view, without the person manually operating the light switch.

Boolean operator—a logical combinatorial symbol, such as AND, OR, NOT, and/or XOR.

can—is capable of, in at least some embodiments.

cause—to bring about.

comprising—including but not limited to.

content—substance and/or substantive portion of a stored and/or written work.

data—distinct pieces of information, usually formatted in a special or predetermined way and/or organized to express concepts.

define—to establish the outline, form, or structure of.

determine—to calculate, decide, obtain, and/or establish.

device—a machine, manufacture, and/or collection thereof.

electronic communication—stored and/or rendered information received via an information device and/or network interface.

e-mail message—mail composed and transmitted via computers connected via a network.

expression—a logical, proximal, and/or mathematical statement that comprises one or more symbols, words, and/or phrases.

financial—of, relating to, and/or involving finance, business, commerce, and/or economics.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

hyperlink—a segment of text and/or a graphical item that serves as a cross-reference between parts of a hypertext document and/or between files and/or hypertext documents.

identification—a designation.

index score—a total relevancy score that has been normalized to other total relevancy scores.

information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

link to—to, upon activation, cause the rendering of.

list—a series of words, phrases, expressions, equations, etc. stored and/or rendered one after the other.

machine instructions—directions adapted to cause a machine, such as an information device, to perform a particular operation or function.

machine readable medium—a physical structure from which a machine can obtain data and/or information. Examples include a memory, punch cards, etc.

match—one that fits, meets, resembles, harmonizes, and/or corresponds in one or more attributes.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

modify—to change, replace, and/or delete.

network—a communicatively coupled plurality of nodes.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

news story—information about recent events and/or happenings.

normalize—to scale at least some of a plurality of values based on the greatest value, the least value, and/or the average value of the plurality of values.

packet—a discrete instance of communication.

phrase—one or more words.

plurality—the state of being plural and/or more than one.

predetermined—established in advance.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

proximity operator—a spatial relationship combinatorial symbol, such as WITHIN, NOT WITHIN, NEAR, CHARACTERS, LETTERS, WORDS, PARAGRAPHS, LINES, PAGES.

rank—to classify, order, and/or position.

rating—a standing and/or measure of popularity and/or usefulness.

receive—to gather, obtain, take, and/or acquire.

relevancy engine—hardware, firmware, and/or software adapted to implement a method for assessing the potential meaningfulness of electronic communications.

relevancy factor—an indicator and/or measure of potential meaningfulness.

relevancy score—a measure of meaningfulness of a particular electronic communication.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

request—an expression of a desire for something.

review—to study, examine, analyze, and/or consider.

server—a computer that processes requests for and/or provides electronic communications.

set—a related plurality.

store—to place, hold, and/or retain data, typically in a memory.

substantially—to a great extent or degree.

sum—a total and/or aggregate.

system—a collection of mechanisms, devices, data, and/or instructions, the collection designed to perform one or more specific functions.

time period—an interval of time.

topic—a subject and/or theme.

total relevancy score—a measure of meaningfulness of a plurality of electronic communications.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

web page—a single document and/or file available via the World Wide Web and identified by a unique URL.

weight—a value assigned to a true expression.

word—a stored and/or rendered representation of a sound and/or combination of sounds, that symbolizes and communicates a meaning and comprises at least one morpheme.

DETAILED DESCRIPTION

Certain exemplary embodiments, sometimes referred to herein as SmartSearchMX, can provide machine instructions adapted to automatically read through electronic communications, such as web pages, e-mail messages, press releases, blog postings, instant messages, and/or news stories and/or reports, etc., such as communications sent over and/or via a network such as the Internet, and/or use fixed and/or flexible criterion and/or relevancy factors to help automatically rank and/or classify the communications in a list with the most relevant communications at the top of the list. Thus, thousands or more communications that are generated every day regarding certain predetermined topics and/or sub-topics can be rendered to a reader with the most relevant at the "top" of the list. Moreover, the most relevant topics can also be ranked and rendered with the very most relevant at the very "top" of the list.

The machine instructions can be centralized and/or distributed. For example, at least a portion of the machine instructions can run on a server adapted to receive and/or provide electronic communications, such as news stories. As another example, at least a portion of the machine instructions can run on a client adapted to receive communications, such as from multiple communications servers. Generally, the machine instructions can run on any type of information device.

Via certain exemplary embodiments, a criterion list can be set up with key words and/or ratings for those key words, such as, for example, from −5 to 5, with −5 being the worst and 5 being the best rating.

The criterion list can be added to, subtracted from, and/or modified at any time for fine-tuning. Such changes to the criterion list can be provided by the reader and/or an operator. The criterion list can contain relevancy factors, expressions, words, partial words, wildcards (e.g., "*"), logical and/or Boolean operators, and/or proximity operators.

A sample criterion list with ratings follows:

Upgrade=3
Downgrade=−3
FDA Approv*=5
FDA Reject*=−5
"Failed" IN SAME SENTENCE AS "FDA" IN SAME SENTENCE AS "test*"=−5
"CEO" AND "arrested"=−5
CFO arrested=−5
Upgrade WITHIN 3 WORDS of Buy=4
CEO WITHIN 2 LINES OF arrest* AND NOT WITHIN SAME PARAGRAPH AS releas*=−2

As communications arrive and/or are obtained from various sources, such as in soft real-time, the criterion, which can be topic-specific, can be applied to the content of each communication (e.g., to the body, meta-content, headline, by-line, date, headings, reviews, and/or abstract, etc. of the communication) and a score generated for that communication. Each occurrence of a word and/or phrase from the criterion list can add that word's and/or phrase's assigned criterion rating to the total score for the communication.

The highest and lowest total scores for any predetermined time period and/or any predetermined topic can be continually updated based on new communications. A range of values, such as a value of 100 (for the highest positive scoring communication) or −100 (for the lowest negatively scoring communication), can be assigned to the highest and lowest total scores to establish an index.

The results of the ranking process can be presented in a ranked table containing hyperlinks that provide one-click access to the actual communications. The ranked table can be rendered via any type of information device, such as on a display of the information device.

The results can be used to add to, subtract from, and/or modify the criterion to improve future results. For example, in certain exemplary embodiments, a reader can rate various communications to provide feedback regarding the usefulness of the communication to the reader. The machine instructions can adjust the criterion based on these ratings, thereby learning what the user currently prefers as more communications are rated.

Thus, certain exemplary embodiments comprise a method comprising, for a plurality of predetermined topics: reviewing a content of each of a plurality of electronic communications; and based on matches between a list of relevancy factors and the content of each of the reviewed electronic communications, automatically ranking the plurality of predetermined topics.

Moreover, certain exemplary embodiments can comprise a method comprising a plurality of activities, comprising: automatically, for each of a plurality of predetermined topics: receiving a first list comprising a plurality of relevancy factors, and, for each relevancy factor, a corresponding weight, each relevancy factor from the plurality of relevancy factors comprising an expression comprising at least two phrases and at least one Boolean or proximity operator; reviewing a content of each of a plurality of electronic communications in soft real-time, a first electronic communication from the plurality of electronic communications received from a first server, and a second electronic communication from the plurality of electronic communications received from a second server; and based on matches between the first list and the content of each of the reviewed electronic communications, determining a relevancy score for each of the reviewed electronic communications; and for a predetermined time period, determining a total relevancy score based on a sum of relevancy scores for all reviewed electronic communications pertaining to the predetermined topic; and automatically ranking the plurality of predetermined topics based on the total relevancy scores; based on the plurality of total relevancy scores, determining an index score for each of the plurality of predetermined topics; and automatically causing the rendering of a second list comprising the ranked plurality of predetermined topics, the corresponding index scores, and, for each of the ranked plurality of predetermined topics, a hyperlink corresponding to a third list comprising at least a portion of each of the plurality of reviewed electronic communications. Certain exemplary embodiments can further comprise: receiving an identification of the predetermined time period; receiving a request to modify the first list; receiving a request to modify a particular relevancy factor of the first list; receiving a request to modify a weight of a particular relevancy factor of the first list; receiving a request to modify a phrase of a particular relevancy factor of the first list; modifying the first list based on a received request; receiving a rating for a reviewed electronic communication from the plurality of reviewed electronic communications; and/or modifying the first list based on the rating. In certain exemplary embodiments, each weight is implicit; each index score is normalized based on the plurality of predetermined topics; each electronic communication from the plurality of reviewed electronic communications is a news story; each electronic communication from the plurality of reviewed electronic communications is a financial news story; each electronic communication from the plurality of reviewed electronic communications is an e-mail message; each electronic communication from the plurality of reviewed electronic communications is a web page; and/or each predetermined topic is a publicly traded company.

Figure 1:
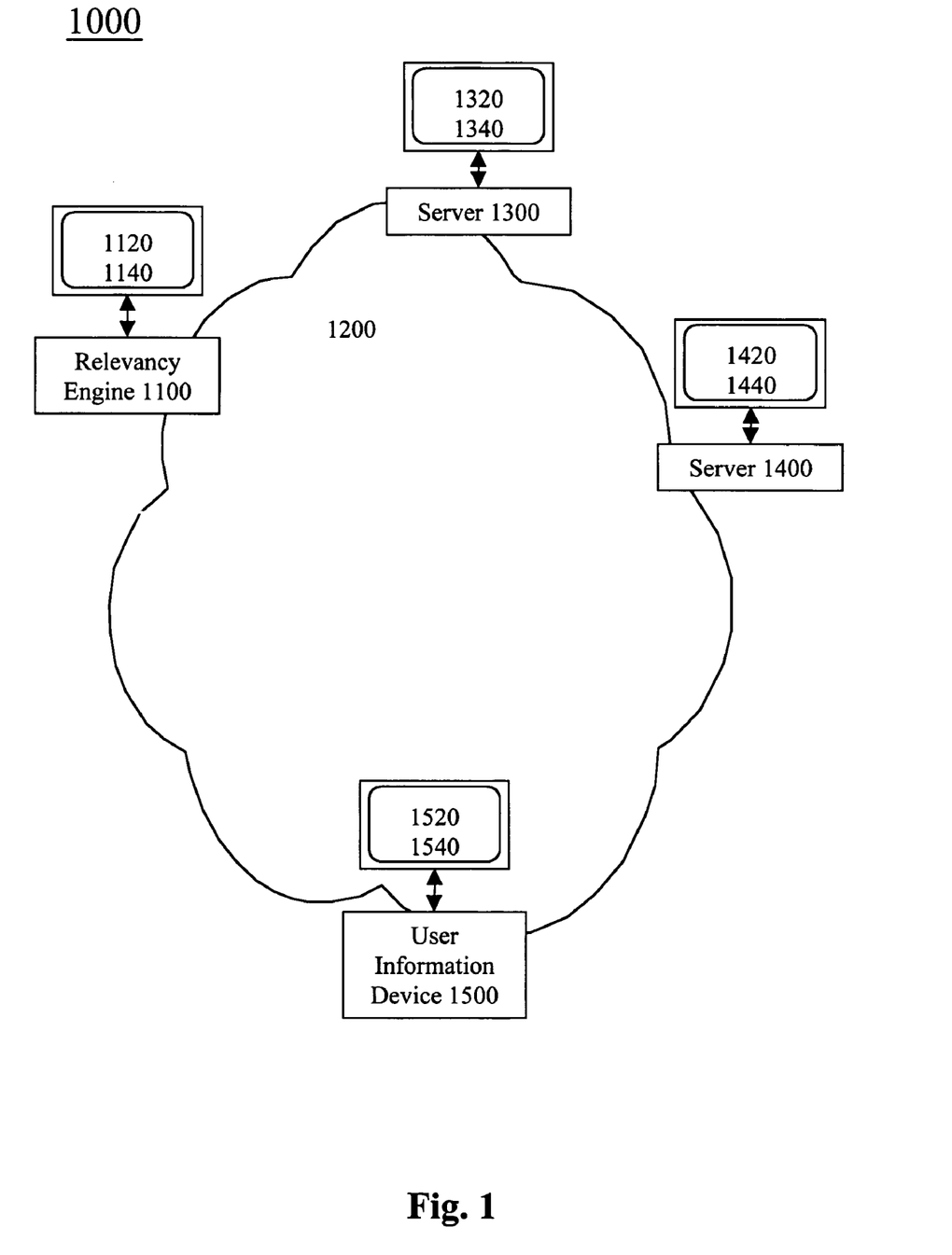
FIG. 1 is a block diagram of an exemplary embodiment of a system 1000.

FIG. 1 is a block diagram of an exemplary embodiment of a system 1000, which can comprise a relevancy engine 1100 coupled via a network 1200 to any number of servers 1300, 1400, and to a user information device 1500. Relevancy engine 1100 can comprise a user interface 1120 and a database 1140, and can implement a method described herein, such as in FIG. 3. Server 1300 can comprise a user interface 1320 and a database 1340. Server 1400 can comprise a user interface 1420 and a database 1440. User information device 1500 can comprise a user interface 1520 and a database 1540.

Figure 2:
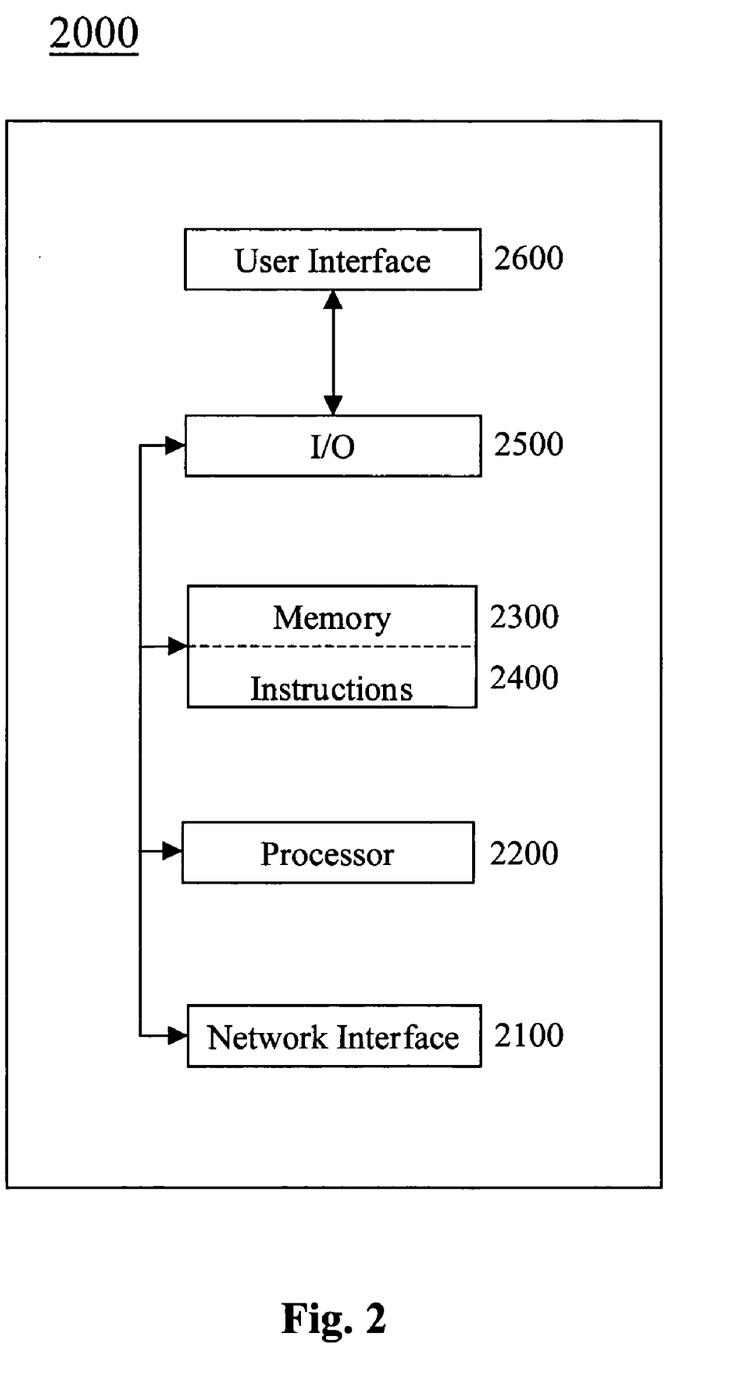
FIG. 2 is a block diagram of an exemplary embodiment of an information device 2000.

FIG. 2 is a block diagram of an exemplary embodiment of an information device 2000, which in certain operative embodiments can comprise, for example, relevancy engine 1100, server 1300, server 1400, and/or user information device 1500 of FIG. 1. Information device 2000 can comprise any of numerous components, such as for example, one or more network interfaces 2100, one or more processors 2200, one or more memories 2300 containing instructions 2400, one or more input/output (I/O) devices 2500, and/or one or more user interfaces 2600 coupled to I/O device 2500, etc.

In certain exemplary embodiments, via one or more user interfaces 2600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

Figure 3:
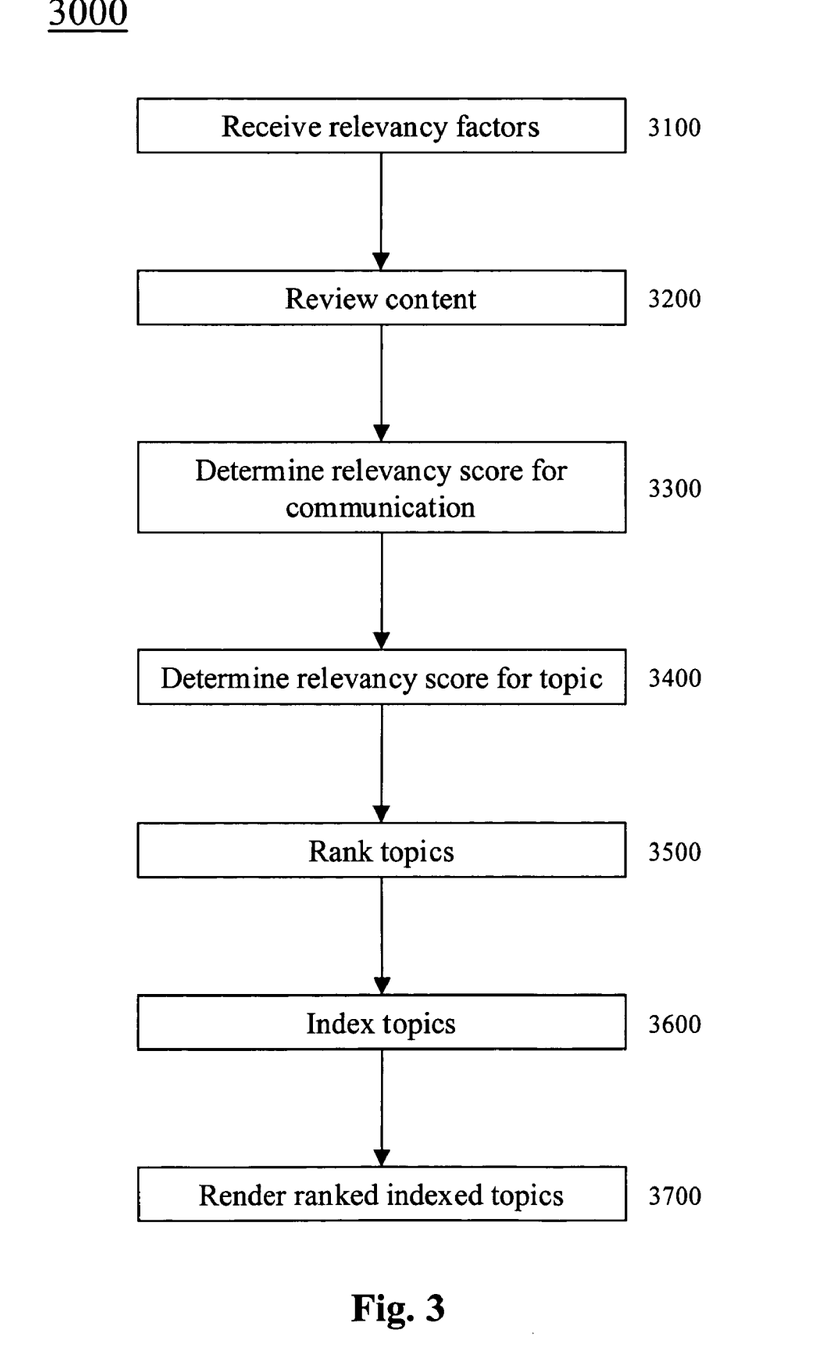
FIG. 3 is a flowchart of an exemplary embodiment of a method 3000.

FIG. 3 is a flowchart of an exemplary embodiment of a method 3000. At activity 3100, relevancy factors can be created, modified, and/or received. At activity 3200, the content of electronic communications can be obtained, received, and/or reviewed. At activity 3300, for each electronic communication, a relevancy score can be obtained, received, and/or determined. At activity 3400, for each topic, a total relevancy score for all corresponding electronic communications can be obtained, received, and/or determined. At activity 3500, the topics can be ranked by total relevancy score. At activity 3600, the topics can be indexed relative to each other. At activity 3700, the ranked and/or indexed topics can be rendered.

Figure 4:
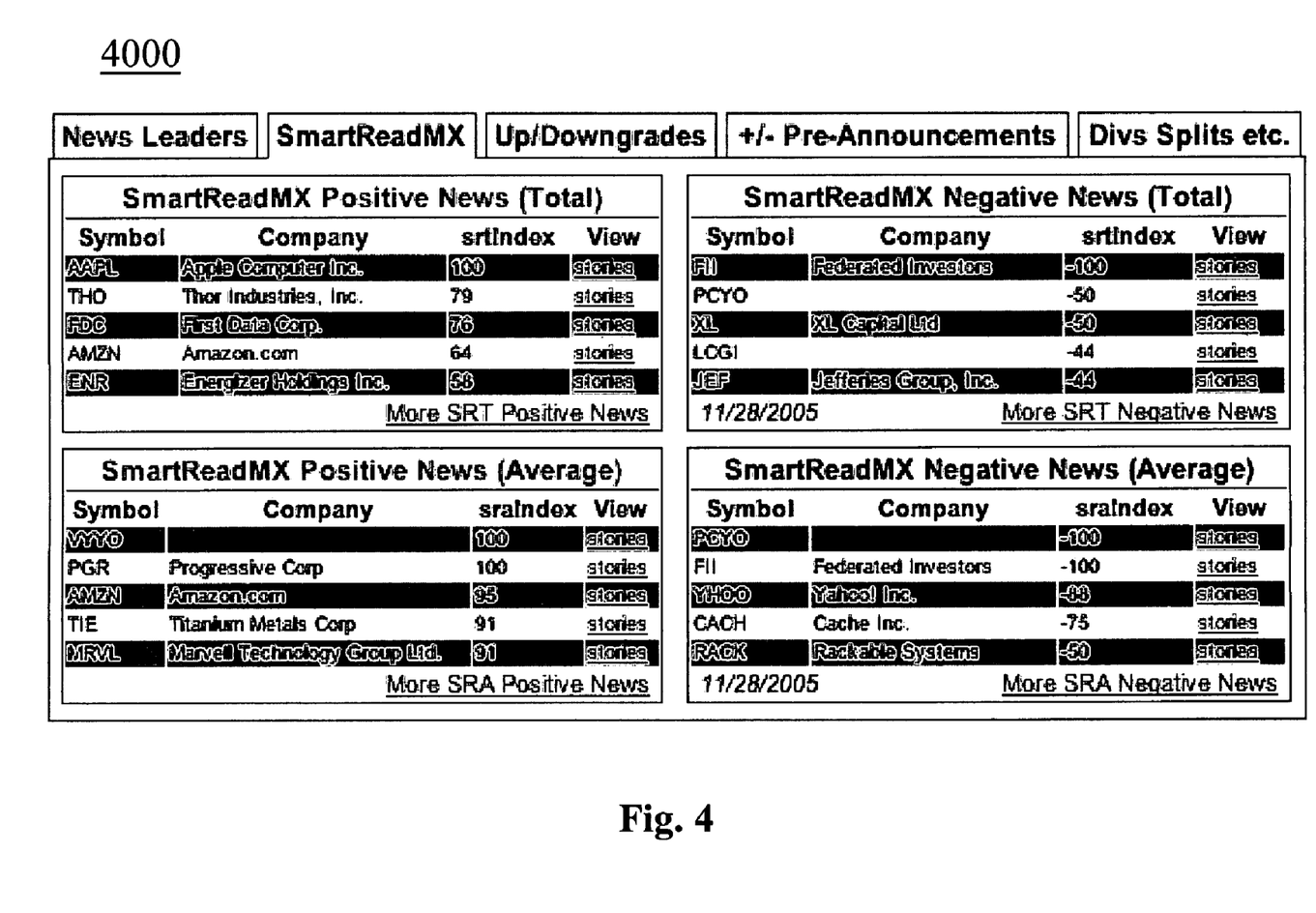
FIG. 4 is a screen shot of an exemplary embodiment of a user interface 4000.
Figure 6:
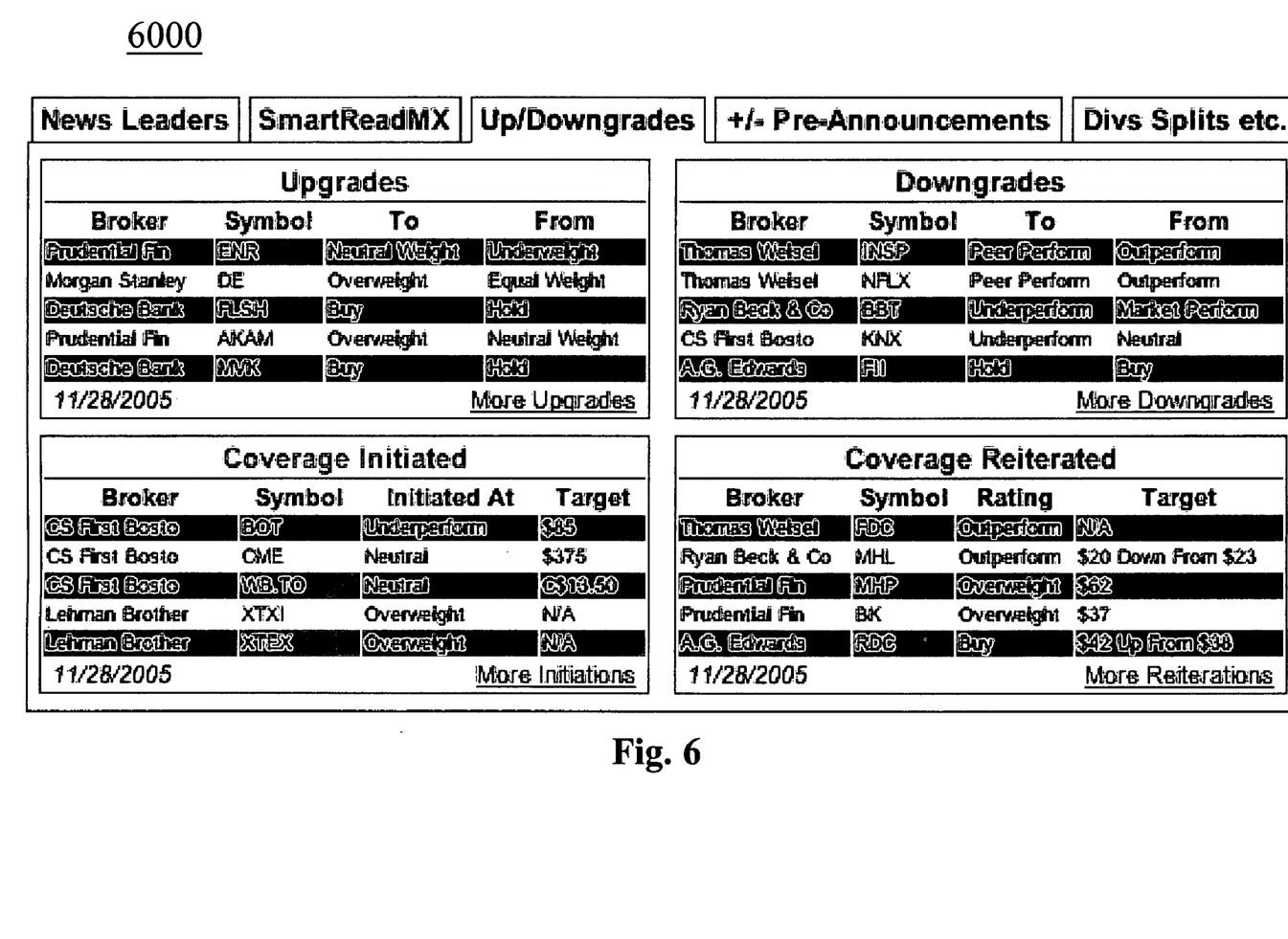
FIG. 6 is a screen shot of an exemplary embodiment of a user interface 6000.
Figure 7:
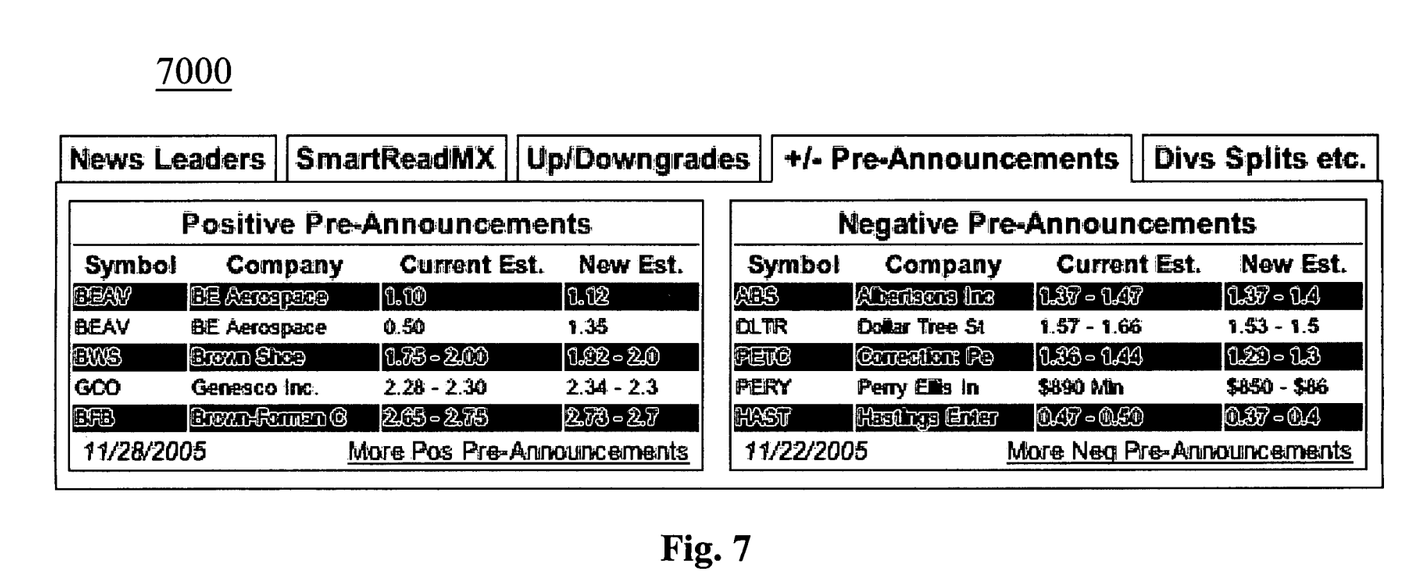
FIG. 7 is a screen shot of an exemplary embodiment of a user interface 7000.
Figure 8:
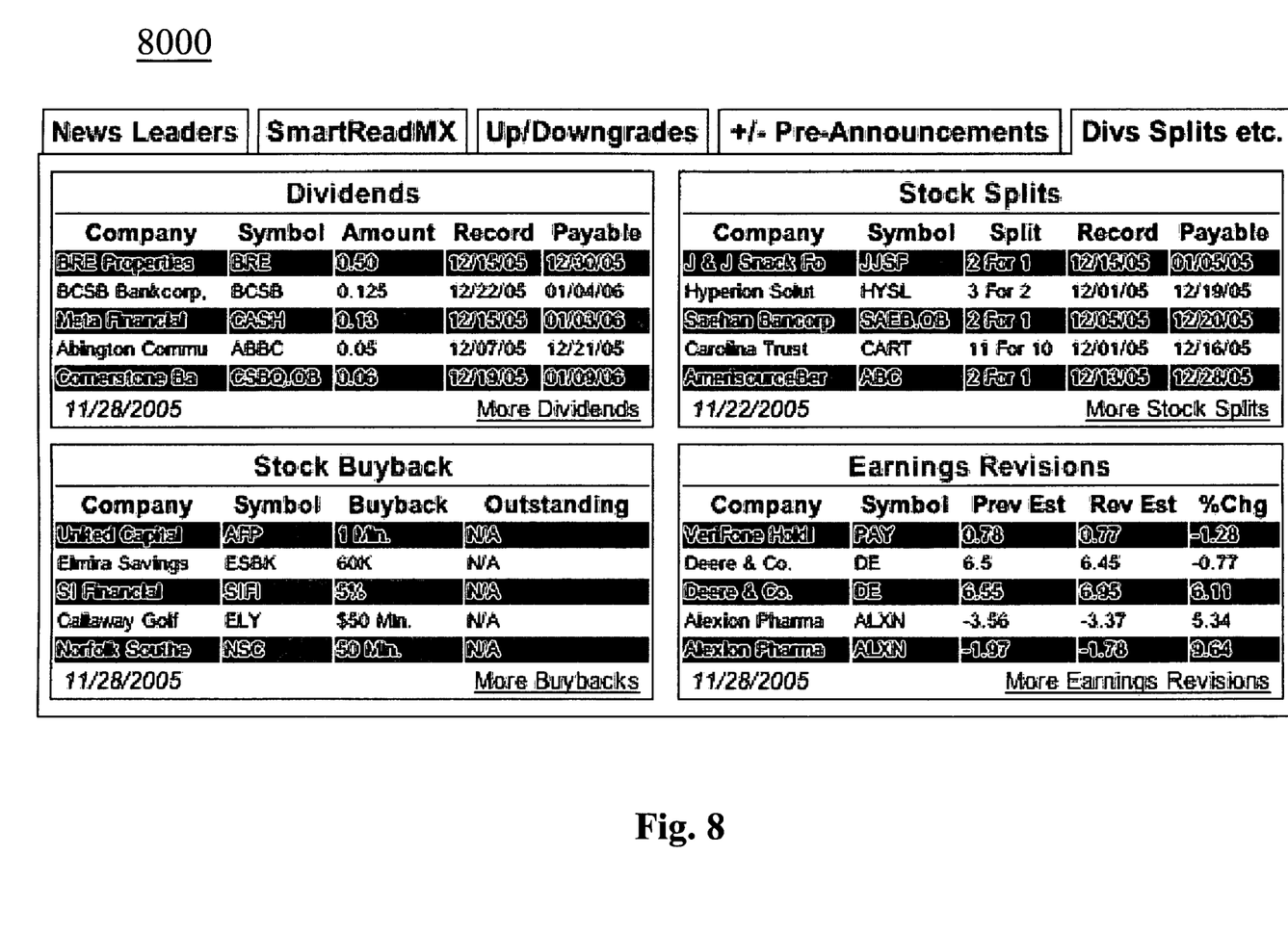
FIG. 8 is a screen shot of an exemplary embodiment of a user interface 8000.

FIGS. 4-9 are screen shots of various exemplary embodiments of various user interfaces 4000, 5000, 6000, 7000, 8000, and 9000, respectively. As shown in FIG. 4, stories related to various publicly traded companies can be received, reviewed, scored, ranked, indexed, and/or referenced via hyperlink, etc.

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method implemented by a relevancy engine coupled to a network and a user information device, the method comprising a plurality of activities, comprising:

automatically, for each of a plurality of publicly traded companies:

at the relevancy engine receiving a first list comprising a plurality of relevancy factors, and, for each relevancy factor, a corresponding weight, each relevancy factor from the plurality of relevancy factors comprising an expression comprising at least two phrases and at least one Boolean or proximity operator;

reviewing a content of each of a plurality of electronic communications in soft real-time, a first news story from the plurality of electronic communications received from a first server on a network, and a second news story from the plurality of electronic communications received from a second server on the network; and based on matches between the first list and the content of each of the reviewed electronic communications, determining a relevancy score for each of the reviewed news stories; and for a predetermined interval of time, determining a total relevancy score based on a sum of relevancy scores for all reviewed news stories pertaining to the publicly traded company;

automatically ranking the plurality of publicly traded companies based on the total relevancy scores;

based on the plurality of total relevancy scores, determining an index score for each of the plurality of publicly traded companies; and automatically displaying at a user information device a second list comprising the ranked plurality of publicly traded companies, the corresponding index scores, and, for each of the ranked plurality of publicly traded companies, a hyperlink to link to a third list comprising at least a portion of each of the plurality of reviewed news stories.

2. The method of claim 1, further comprising receiving an identification of the predetermined interval of time.

3. The method of claim 1, further comprising receiving a request to modify the first list.

4. The method of claim 1, further comprising receiving a request to modify a particular relevancy factor of the first list.

5. The method of claim 1, further comprising receiving a request to modify a weight of a particular relevancy factor of the first list.

6. The method of claim 1, further comprising receiving a request to modify a phrase of a particular relevancy factor of the first list.

7. The method of claim 1, further comprising modifying the first list based on a received request.

8. The method of claim 1, further comprising receiving a rating for a reviewed news story from the plurality of reviewed electronic communications.

9. The method of claim 1, further comprising:
receiving a rating for a reviewed news story from the plurality of reviewed electronic communications; and modifying the first list based on the rating.

10. The method of claim 1, wherein each weight is implicit.

11. The method of claim 1, wherein each index score is normalized based on the plurality of predetermined topics.

12. The method of claim 1, wherein each news story from the plurality of reviewed news stories is a financial news story.

13. A system, comprising:
a relevancy engine adapted to:
automatically, for each of a plurality of predetermined publicly traded companies:
receive a first list comprising a plurality of relevancy factors, and, for each relevancy factor, a corresponding weight, each relevancy factor from the plurality of relevancy factors comprising a expression comprising at least two phrases and at least one Boolean or proximity operator;

review a content of each of a plurality of electronic communications in soft real-time, a first news story from the plurality of electronic communications received from a first server, and a second news story from the plurality of electronic communications received from a second server; and based on matches between the first list and the content of each of the reviewed news stories, determine a relevancy score for each of the reviewed news stories; and for a predetermined interval of time, calculate a total relevancy score based on a sum of relevancy scores for all reviewed news stories pertaining to the publicly traded companies; and automatically rank the plurality of publicly traded companies based on the total relevancy score;

based on the plurality of total relevancy scores, determine an index score for each of the plurality of publicly traded companies; and automatically display a second list comprising the ranked plurality of publicly traded companies, the corresponding index scores, and, for each of the ranked plurality of publicly traded companies, a hyperlink adapted to link to a third list comprising at least a portion of each of the plurality of reviewed news stories.

* * * * *